United States Patent [19]
Nevins

[11] 4,296,734
[45] Oct. 27, 1981

[54] SOLAR COLLECTOR

[76] Inventor: Robert L. Nevins, Rte. 28A, Boiseville, N.Y. 12412

[21] Appl. No.: 129,033

[22] Filed: Mar. 10, 1980

[51] Int. Cl.³ .............................................. F24J 3/02
[52] U.S. Cl. .................................... 126/431; 126/429; 126/444; 126/449; 126/417; 98/88 R; 98/96
[58] Field of Search ............... 126/417, 429, 431, 432, 126/444, 449; 98/88 R, 96; 52/788, 302, 304

[56] References Cited

U.S. PATENT DOCUMENTS

| 246,626 | 9/1881 | Morse | 126/429 |
|---|---|---|---|
| 327,414 | 9/1885 | Scharnweber | 98/88 R |
| 2,096,892 | 10/1937 | Gelstharp | 98/96 |
| 2,931,578 | 4/1960 | Thompson | 126/429 X |
| 2,998,005 | 8/1961 | Johnston | 126/449 X |
| 3,612,825 | 10/1971 | Chase et al. | 98/88 R X |
| 3,925,945 | 12/1975 | White | 126/429 X |
| 4,151,954 | 5/1979 | Jacobs | 126/429 |
| 4,159,707 | 7/1979 | Miquel | 126/429 |

Primary Examiner—Larry Jones
Attorney, Agent, or Firm—Charles E. Baxley

[57] ABSTRACT

A heat sink in the form of a mesh is interposed between two spaced panes in a window or door light. A combination of holes and passageways formed in the window sash frame members permit the selective establishment of convective air currents past the mesh to absorb the solar converted thermal heat stored in the sink. By manipulating the source of the air for these convective currents (i.e. from the inside or the outside of a building) and by choosing the volume into which the warmed air currents are to be discharged (i.e. inside or outside the building) significant heating and cooling efficiencies are achieved.

2 Claims, 5 Drawing Figures

SOLAR COLLECTOR

This invention relates to techniques for converting solar energy through transparent panels and more particularly to a window in which a heat absorbing screen is interposed between two panes of glass in order to selectively control the flow of heat through that window and the like.

Windows, door lights and similar translucent structures probably represent the single greatest source of heat loss in cold weather and heat gain in warm weather in most buildings. Recognition of this fact has led to a number of widely accepted developments, of which the passive "storm" window and the passive "Thermal Pane" insulating window are typical. Although these devices often are quite effective in attenuating heat flow, nevertheless they fail to achieve truly optimum performance because they act only as heat barriers. Thus, these structures fail to provide some means for manipulating or taking full advantage of the radiant solar energy that is incident upon the window or door light in question.

As heating and air conditioning costs increase, and as the fuels that are needed to provide this heating and air conditioning become more scarce there is an unquestionable need to improve conservation and heat utilization technology.

Accordingly, the invention satisfies this need, to a great extent, by interposing a heat sink between spaced panes in a window, door light or the like. Within the frame that supports the panes and the heat sink, passageways are formed that establish selective fluid communication between the interior of the building, the exterior of the building and the air space between the panes in which the heat sink is lodged.

A mesh or screen colored flat black that is lodged between the panes and is coextensive with the corresponding pane area provides an excellent heat sink for the purposes of the invention. Depending on circumstances the mesh absorbs heat that otherwise would flow uncontrolled into a building while permitting relatively unobstructed vision through the window or door light. Through appropriate opening and closing of the communicating passageways in the frame, convective air currents are established that absorb heat from the mesh and discharge this heat to the atmosphere outside of the building as a thermal conservation measure, depending on particular needs.

Consequently, the invention is a major improvement over existing passive thermal barriers as it prevents half the amount of solar gain in hot weather, yet it absorbs the total insolation incident upon it during the winter months when it is so badly needed, half of it controllable.

Figure 1:
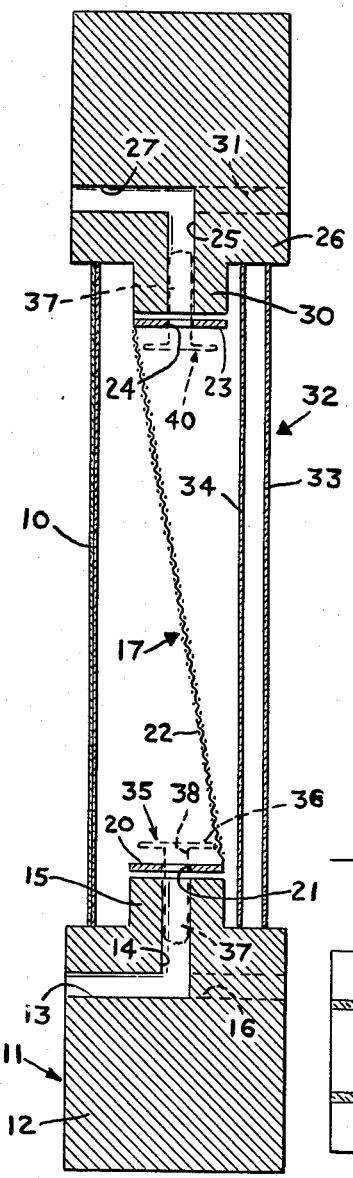
FIG. 1 is a side elevation in full section of a typical embodiment of the invention.

Attention is invited to FIG. 1 which shows a glaze 10 of glass, Lexan, plexiglass, or the like. The glaze 10 is mounted within a frame 11 that supports the glaze 10 in the interior of a building (not shown in the drawing). The glaze 10, although mounted snugly and in a generally air tight manner within the frame 11, nevertheless can be removed from the frame 11 for cleaning, and the like, by unthreading detents or other suitable means (not shown in the drawing) for securing the glaze 10 in the frame 11.

In accordance with a feature of the invention a bottom horizontal member 12 of the frame 11 has a horizontally disposed row of ¼" diameter holes, of which only the hole 13 is shown. These holes establish communication between the interior of the building and respective vertically oriented passageways of which a passageway 14 is shown in FIG. 1. The passageway extends downwardly from a glazing separator 15 that protrudes from the top of the member 12.

An alternate array of vertically oriented passageways (not shown in FIG. 1 because they are in alignment with the passageway 14) establish communication between the top of the glazing separator 15 and a group of horizontally disposed ¼" holes formed in the frame member 12, of which only the hole 16 is shown in FIG. 1. The hole 16, and its companion holes, as well as the respective vertically communicating passageways for each of these holes are alternately interleaved between the holes 13 and 14 at a center-to-center spacing of about ½". The hole 16, and its associated holes establish communication between the atmosphere external to the building and the volume defined by the frame 11.

Within the frame 11, and borne on the top surface of the glazing separator 15, is a heat sink 17. As illustrated, the heat sink 17 has a horizontally oriented flange 20 that is parallel with the separator 15. The flange has a group of aligned ¼" diameter holes 21 (FIG. 2) formed therein. Each of the holes in the group 21 are aligned with a respective hole in the glazing separator 15 (FIG. 1).

Figure 2:
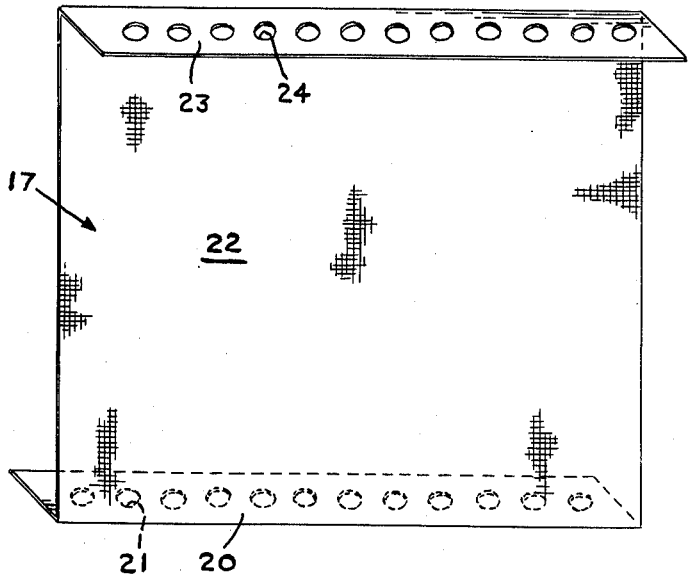
FIG. 2 is a perspective view of a heat sink or energy conversion screen connection with the embodiment of the invention that is shown in FIG. 1.

The flange 20 is connected on one edge to a diagonally oriented mesh or energy converstion screen 22 that preferably is coated or painted flat black in order to better absorb heat. The mesh 22 is generally coextensive with the glaze 10. The wire warp and woof, moreover, that comprises the mesh 22 have an area in the vertical plane that is about equal to 50% of the entire area of the glaze 10. The upper end of the mesh 22 is joined to an edge of another horizontally disposed flange 23. As illustrated in FIG. 2, the flange 23 also is pierced with a group of ¼" diameter holes 24.

Each of the holes in the group 24 also is in alignment with a respective vertical hole, of which only the 25 (FIG. 1) is shown in a top horizontal frame member 26. In a manner similar to that described with respect to the bottom horizontal frame member 12, vertical holes 25 each communicate with respective alternatingly oriented horizontal holes 27 and 31. As shown, the glazing separator 30 is parallel and adjacent to the flange 23. The holes 27, moreover, establish communication between the inside of the building (not shown) and the volume within the frame 11. Further in this respect, the frame 11 can be made of wood, metal, or any other suitable materials.

An exterior glazing 32 is provided by two parallel panes 33 and 34 of glass, Lexan, plexiglass or the like. The innermost pane 34 is close to the shoulders formed by the glazing separators 15 and 30. The outermost pane 33, however, forms a generally air tight seal with the peripheral, abutting portions of the frame 11. The frames 33 and 34 are spaced a short horizontal distance from each other to provide a further thermal barrier for the window or door light construction. Naturally, although the fit between the exterior glazing 32 and the frame 11 is quite snug the glazing nevertheless can be removed from the frame for cleaning, and the like.

Figure 3:
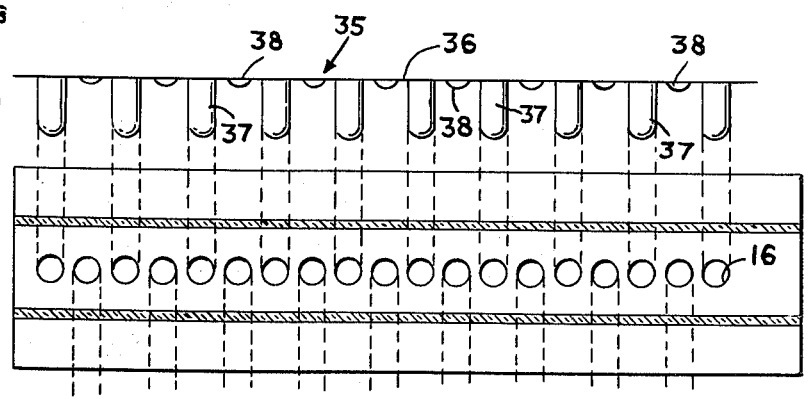
FIG. 3 is a plan view of a vent obstruction strip and a sash frame for use in connection with the FIG. 1 structure.

Also as shown in FIG. 1, the passageways 14, or the companion alternate passageways that communicate with the holes 16, are selectively closed (as described subsequently in more complete detail) by means of a vent obstruction strip 35 (FIG. 3). As shown, the strip 35 is formed from a flat plate 36 that is as wide as, but slightly shorter than the length of the flange 20 (FIG. 2) that is attached to the mesh 22. Nipples 37 (FIG. 3) each about $\frac{3}{4}''$ long and having diameters of slightly less than $\frac{1}{4}''$ protrude from one side of the strip 36. The nipples 37 are equal in number to one half of the total number of passageways formed in the glazing separator 15 (FIG. 1). These nipples 37 are so spaced along the length of the strip 36 that they each align with a respective one of the alternate passageways, either in the group associated with the passageway 14, or with the group that communicate with the array of holes 16.

Interposed and equidistant between adjoining nipples 37 are $\frac{1}{4}''$ diameter punched holes 38, which align with those passageways that are not to be closed.

An identical vent obstruction strip 40 also is associated with the passageways that are formed in the glazing separator 30 on the top horizontal member 26. In this manner, by moving the strips 35 and 40 horizontally through a distance that is equal to the spacing between adjacent passageways in the glazing dividers 15 and 30, respectively, communication is established, selectively, with the volume between the glazings 10 and 32 that is defined by the frame 11 and the atmosphere that is interior to and exterior to the building.

In operation for, let us say cold weather, the glaze 10 is removed from the frame 11 from the interior of the building to expose the vent obstruction strips 36 and 40. The strip 36 is shifted horizontally to establish free fluid communication between the interior of the building, the array of holes 13, the respective connecting passageways 14 and the volume within the frame 11. Similarly, the strip 40 also is shifted horizontally to provide fluid communication between the volume within the frame 11 and the interior of the building via the array of holes 27 and the respectively associated passageways 25. By so shifting the obstruction strips 35 and 40, the respective sets of nipples on these strips block fluid communication between the volume within the frame 11 and the atmosphere outside of the building.

The pane 10 of glaze is replaced in the frame 11. In this circumstance, the mesh 22 in the heat sink absorbs about 50% of the solar radiation incident upon it and converts it to longwave thermal radiation. The mesh 22, thus warmed, in turn heats the surrounding air within the frame 11, causing a convective current of colder air to flow from the building interior to the heat sink 17 by way of the holes 13, the associated passageways 14 and the punched holes 38 in the strip 35. This colder air is warmed to a higher temperature by the solar heated mesh 22, thereby causing the now warmer and less dense air to flow back into the building by way of the punched holes in the strip 40, the passageways 25 and the associated holes 27 in the top horizontal frame member 26.

To vent the building during warm, sunny days, the strips 35 and 40 are once more shifted horizontally to establish fluid communication between the heat sink 17 and the exterior atmosphere. For instance, the strip 35 is repositioned to enable cooler air to flow toward the mesh 22 from the interior of the building through the holes 13 and the associated passageways 14 to the mesh. The mesh 22, warmed directly by the rays of the sun, or the like heats the cooler air from the building, thereby causing this warmer and less dense air to flow out of the volume within the frame 11 to the atmosphere external to the building by way of the passageways in the top horizontal frame member 26 that are in communication with respective holes in the group of horizontal holes 31.

Alternatively, cool air can be kept within the building and the heat absorbed in the heat sink 17 can be dissipated back into the atmosphere outside of the building. To accomplish this purpose, the vent obstruction strip 35 is shifted horizontally to open communication between the atmosphere outside of the building and the volume within the frame via the holes 16 and the respective associated vertical passageways. Thus, the lower cooler air is drawn via holes 16 from the atmosphere outside of the building to be heated at the mesh 22. This warmed air then is discharged to the atmosphere by way of the holes 31.

It should be noted that wherever one set of holes in either of the horizontal frame members 12 and 26 is placed in fluid communication with the volume within the frame 11 by shifting the strips 35 and 40, respectively, the other arrays of holes in the same members are obstructed to block fluid communication through these now temporarily closed holes. It should be further noted that the horizontal groups of holes 16 and 31 in the frame members 12 and 26, respectively, should be provided with a slight downward slope toward the exterior of the building to permit any accumulated rainwater, condensation, or moisture to drain out of the frame and not to collect in the passageways.

Thus, the invention provides not only a novel thermal barrier for installation in a window, door light, or the like, but also a highly ingenious and efficient technique for utilizing or dispersing radiant solar energy that is stopped at the thermal barrier.

Quite often two windows will be "double hung". That is, two windows will be mounted in the same window sash frame, one of the windows being positioned above the other in the common frame.

Figure 4:
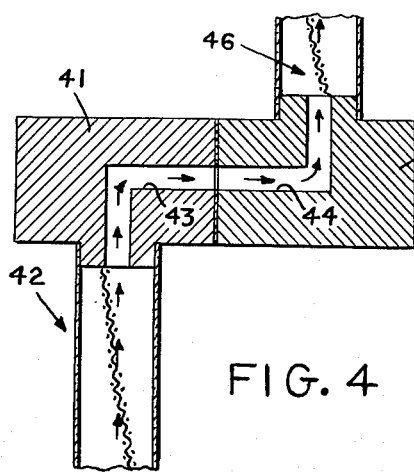
FIG. 4 is a portion, in full section, of the application of the invention to a double hung window.

FIG. 4 illustrates a specific structure for applying the principles of the invention of this combination. Thus a top horizontal frame member 41 for lowermost window 42 has an array of horizontally disposed holes 43 which, when properly aligned with corresponding holes, a group of holes 44 in bottom horizontal frame member 45 of an uppermost window 46 provide fluid communication between the volume bounded by the frame of the lowermost window 42 and the volume that is bounded by the frame of the uppermost window 46.

The thermal character, source and ultimate destination of the air that is flowing convectively from the lowermost window to the uppermost window can be controlled and regulated in the manner described above in connection with FIGS. 1 through 3.

Figure 5:
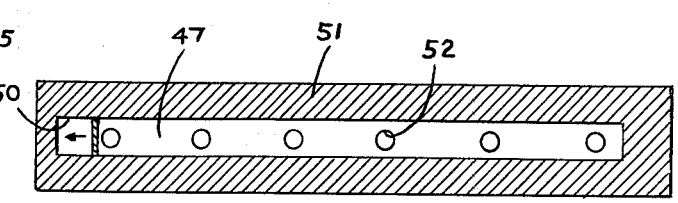
FIG. 5 is a plan view, in full section of a slidable vent cover.

In some instances it may be desirable to substitute a sliding vent cover 47 that is mounted for horizontal movement between a recess 50 that is formed in a horizontal frame member 51. As illustrated, the vent cover has a group of uniformly spaced apertures 52 that are equal in number, diameter and spacing to the generally horizontal holes (not shown) that protrude through the side of the frame member 51 in which the sliding vent cover is received. To establish convective air flow from the atmosphere on the same side of the frame member 51 through to the volume within the window frame (not shown in FIG. 5) it is only necessary to move the apertures 52 into registry with the corresponding related generally horizontal holes in the frame member 51. To terminate convective air flow through the frame member 51, the vent cover 47 is shifted horizontally through a sufficient distance to move the apertures 52 out of alignment with the holes.

This feature of the invention also can be used in substitution for or in addition to the vent obstruction strips 35 and 40 that were described in connection with FIGS. 1 and 3.

Although the invention has been described in detail with respect to a window or a door light, it is nevertheless capable of application to any combination of translucent materials in which the transmission of thermal energy is to be attenuated and the heat thus stopped applied to some useful purpose.

I claim:

1. A heating and cooling structure comprising a pair of spaced translucent glazes, a frame for mounting said spaced glazes, said frame having members at two opposite ends of said glazes for engaging said glazes therebetween, passageways formed in said oppositely disposed members to selectively establish fluid communication from either of the sides of said members with the volume established within said frame, a heat sink mounted within said frame between said spaced translucent glazes in order to absorb radiant solar heat applied to said structure and to transfer the heat to said fluid flowing through said volume established within said frame from either of said selected sides of said frame members, said heat sink being a mesh disposed within said frame volume, said mesh being generally coextensive with said spaced glazes, a laterally slidable vent cover received in said frame for movement therewithin, and a plurality of uniformly spaced apertures formed in said vent cover for selective alignment and misalignment with said frame passageways in order to promote and to stop fluid flow between the side of the frame member in which said vent cover is received and the volume established within said frame.

2. A structure according to claim 1 wherein said mesh further comprises a flat black coloring in order to enhance thermal absorption properties of said mesh.

* * * * *